US012157027B2

(12) United States Patent
Vallamkondu et al.

(10) Patent No.: US 12,157,027 B2
(45) Date of Patent: *Dec. 3, 2024

(54) OPTICAL FIRING CARTRIDGE FOR FIRE EXTINGUISHER

(71) Applicant: Kidde Technologies, Inc., Wilson, NC (US)

(72) Inventors: Aswin Kumar Vallamkondu, Karnataka (IN); Terry Simpson, Wake Forest, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 127 days.

This patent is subject to a terminal disclaimer.

(21) Appl. No.: 17/675,168

(22) Filed: Feb. 18, 2022

(65) Prior Publication Data

US 2023/0264058 A1 Aug. 24, 2023

(51) Int. Cl.

*A62C 37/46* (2006.01)
*A62C 3/08* (2006.01)
*A62C 37/40* (2006.01)

(52) U.S. Cl.

CPC ................ *A62C 37/46* (2013.01); *A62C 3/08* (2013.01); *A62C 37/40* (2013.01)

(58) Field of Classification Search

CPC ............ A62C 37/46; A62C 3/08; A62C 37/40
USPC ............................ 169/47, 26, 28, 62, 74, 89
See application file for complete search history.

(56) References Cited

U.S. PATENT DOCUMENTS

| | | | |
|---|---|---|---|
| 3,884,307 A | 5/1975 | Williams | |
| 3,915,237 A | 10/1975 | Rozniecki | |
| 7,784,403 B2 | 8/2010 | Moulard et al. | |
| 2016/0136468 A1 | 5/2016 | Kosovski-Shahor | |
| 2023/0264055 A1 * | 8/2023 | Vallamkondu ......... | A62C 37/11 169/62 |

FOREIGN PATENT DOCUMENTS

| | | |
|---|---|---|
| CN | 201213989 Y | 4/2009 |
| CN | 204612617 U | 9/2015 |
| WO | 19999000343 A1 | 1/1999 |

OTHER PUBLICATIONS

European Search Report for European Application No. 23153819.0; dated Jul. 17, 2023; 74 pages.

* cited by examiner

*Primary Examiner* — Christopher S Kim
(74) *Attorney, Agent, or Firm* — CANTOR COLBURN LLP

(57) ABSTRACT

A fire protection system includes a fire extinguisher including a housing. The housing includes an extinguisher outlet and a burst disk. The burst disk configured to retain a volume of fire suppressant material in the housing. A firing cartridge is operably connected to the housing. The firing cartridge includes an output charge, and an ignition charge that, when detonated, causes release of the output charge to rupture the burst disk and release the volume of fire suppressant material through the extinguisher outlet. An optical fiber is configured to transmit a light signal toward the ignition charge to heat and detonate the ignition charge. A light source is operably connected to the optical fiber to transmit the light signal along the optical fiber.

18 Claims, 2 Drawing Sheets

OPTICAL FIRING CARTRIDGE FOR FIRE EXTINGUISHER

BACKGROUND

Exemplary embodiments pertain to the art of fire protection systems, and in particular to firing mechanisms for fire extinguishers of fire protection systems.

In fire protection systems, such as those used in aircraft, fire extinguishers utilize electrical firing cartridges to puncture a burst disk in the fire extinguisher, resulting in the release of extinguishing agent from the fire extinguisher.

In such systems, an electrical pulse is generated and transmitted to the firing cartridge to activate the fire extinguisher. A relatively high current, in some instances 3.5 amps for a pulse duration of 10 to 50 milliseconds is used to activate the firing cartridge. The electrical pulse is transmitted to a bridge wire in communication with an ignition charge, and the bridge wire initiates explosion of the ignition charge by heating the ignition charge to its ignition temperature.

The electrical firing cartridge, however, is prone to issues such as electrostatic discharge and bridge wire corrosion. A high current firing circuit must be designed and installed in a location remote from the firing cartridge and high current electrical conductors are routed from the circuit to each of the fire extinguishers. Such systems are subject to losses and noise which much be accounted for.

BRIEF DESCRIPTION

In one embodiment, a fire protection system includes a fire extinguisher including a housing. The housing includes an extinguisher outlet and a burst disk. The burst disk configured to retain a volume of fire suppressant material in the housing. A firing cartridge is operably connected to the housing. The firing cartridge includes an output charge, and an ignition charge that, when detonated, causes release of the output charge to rupture the burst disk and release the volume of fire suppressant material through the extinguisher outlet. An optical fiber is configured to transmit a light signal toward the ignition charge to heat and detonate the ignition charge. A light source is operably connected to the optical fiber to transmit the light signal along the optical fiber.

Additionally or alternatively, in this or other embodiments a bridge wire is located between the optical fiber and the ignition charge. The light signal is configured to heat the bridge wire to detonate the ignition charge.

Additionally or alternatively, in this or other embodiments a lens is located between the optical fiber and the bridge wire. The lens is configured to converge the light signal at the bridge wire to heat the bridge wire.

Additionally or alternatively, in this or other embodiments the light source is a laser.

Additionally or alternatively, in this or other embodiments two or more fire extinguishers are operably connected to the light source.

Additionally or alternatively, in this or other embodiments a sensor is operably connected to the light source. The sensor is configured to detect a fire or smoke condition to initiate operation of the light source.

In another embodiment, a method of operating a fire protection system includes providing a fire extinguisher at a selected location. The fire extinguisher includes a housing, the housing includes an extinguisher outlet, and a burst disk. The burst disk is configured to retain the volume of fire suppressant material in the housing. A firing cartridge is operably connected to the housing. The firing cartridge includes an output charge and an ignition charge that, when detonated, causes release of the output charge to rupture the burst disk and release the volume of fire suppressant material through the extinguisher outlet. A light signal is transmitted from a light source along an optical fiber toward the ignition charge, and the ignition charge is heated via the light signal, thereby detonating the ignition charge.

Additionally or alternatively, in this or other embodiments a bridge wire located between the optical fiber and the ignition charge is heated via the light signal, wherein heating of the bridge wire detonates the ignition charge.

Additionally or alternatively, in this or other embodiments the light signal is transmitted through a lens located between the optical fiber and the bridge wire. The lens is configured to converge the light signal at the bridge wire to heat the bridge wire.

Additionally or alternatively, in this or other embodiments the light source is a laser.

Additionally or alternatively, in this or other embodiments two or more fire extinguishers are operably connected to the light source.

Additionally or alternatively, in this or other embodiments a smoke or fire condition is detected via a sensor operably connected to the light source, and operation of the light source is initiated when the smoke or fire condition is detected.

In yet another embodiment, an aircraft includes an aircraft structure, and a fire protection system located in the aircraft structure. The fire protection system includes a fire extinguisher including a housing. The housing includes an extinguisher outlet and a burst disk. The burst disk is configured to retain a volume of fire suppressant material in the housing. A firing cartridge is operably connected to the housing. The firing cartridge includes an output charge, and an ignition charge that, when detonated, causes release of the output charge to rupture the burst disk and release the volume of fire suppressant material through the extinguisher outlet. An optical fiber is configured to transmit a light signal toward the ignition charge to heat and detonate the ignition charge, and a light source is operably connected to the optical fiber to transmit the light signal along the optical fiber.

Additionally or alternatively, in this or other embodiments a bridge wire is located between the optical fiber and the ignition charge. The light signal is configured to heat the bridge wire to detonate the ignition charge.

Additionally or alternatively, in this or other embodiments a lens is located between the optical fiber and the bridge wire. The lens is configured to converge the light signal at the bridge wire to heat the bridge wire.

Additionally or alternatively, in this or other embodiments the light source is a laser.

Additionally or alternatively, in this or other embodiments a sensor is operably connected to the light source. The sensor is configured to detect a fire or smoke condition to initiate operation of the light source.

Additionally or alternatively, in this or other embodiments two or more fire extinguishers are operably connected to the light source.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
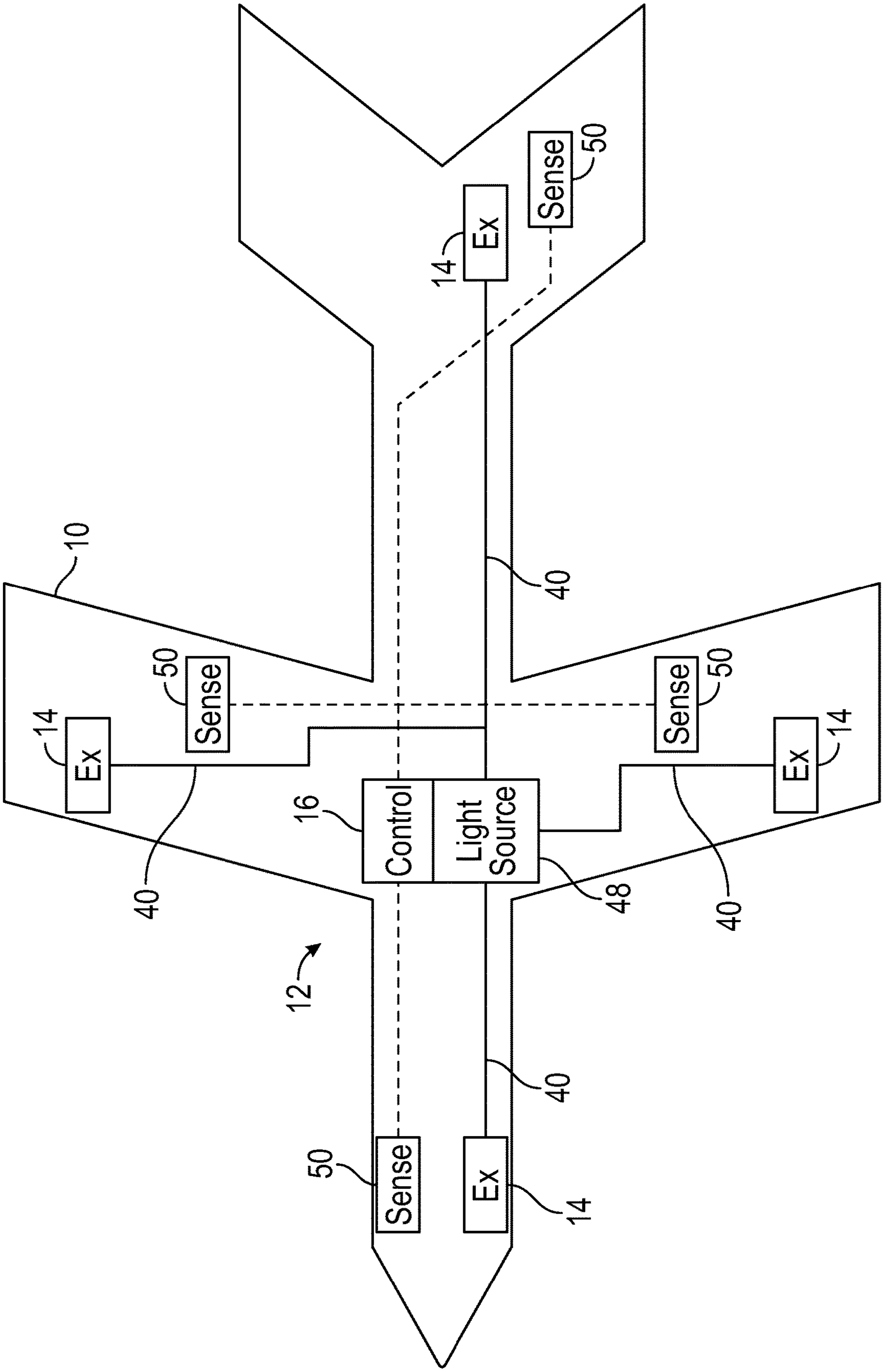
FIG. 1 is a schematic illustration of an embodiment of an aircraft, including a fire protection system.

FIG. 1 is a schematic illustration of an aircraft 10. The aircraft 10 includes a fire protection system 12 including one or more fire extinguishers 14. The fire extinguishers 14 may be arrayed around the aircraft 10 at selected locations. Further, while described herein in the context of an aircraft 10, one skilled in the art will readily appreciate that the fire protection system 12 described herein may be utilized in other applications, such as buildings, trucks, trains, or the like. The fire extinguishers 14 are operably connected to a controller 16 located in the aircraft 10.

Figure 2:
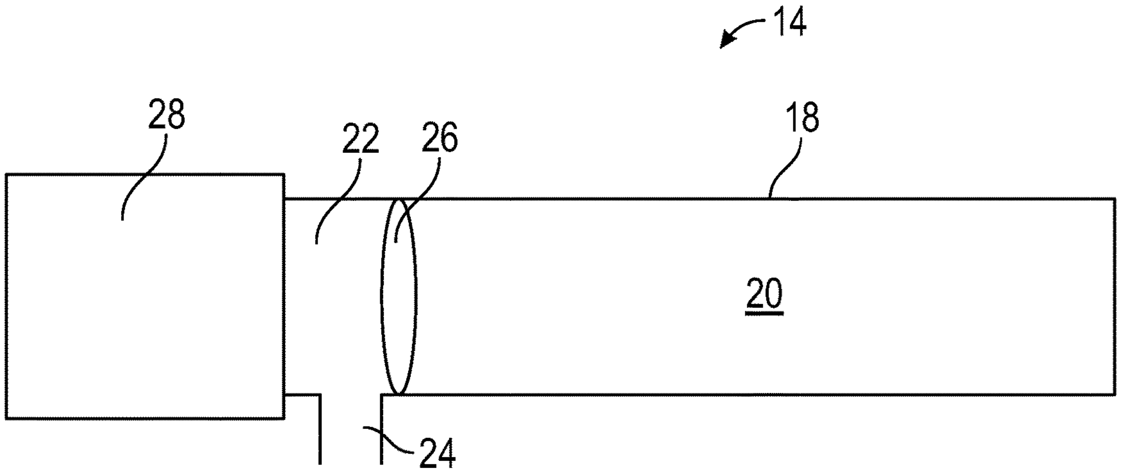
FIG. 2 is a schematic illustration of an embodiment of a fire extinguisher of a fire protection system.

Referring now to FIG. 2, illustrated is an embodiment of a fire extinguisher 14. The fire extinguisher 14 includes an extinguisher housing 18 or tank containing a volume of fire suppressant material 20. The fire extinguisher 14 includes a nozzle portion 22 having an extinguisher outlet 24 through which the fire suppressant material 20 is expelled from the fire extinguisher 14. A burst disk 26 or diaphragm is located in the extinguisher housing 18 and retains the fire suppressant material 20 until operation of the fire extinguisher 14 is initiated by rupturing of the burst disk 26.

A firing cartridge 28 is operably connected to the fire extinguisher 14 such that when the firing cartridge 28 is activated the burst disk 26 is ruptured, and the fire suppressant material 20 flows from the extinguisher housing 18 and through the extinguisher outlet 24.

Figure 3:
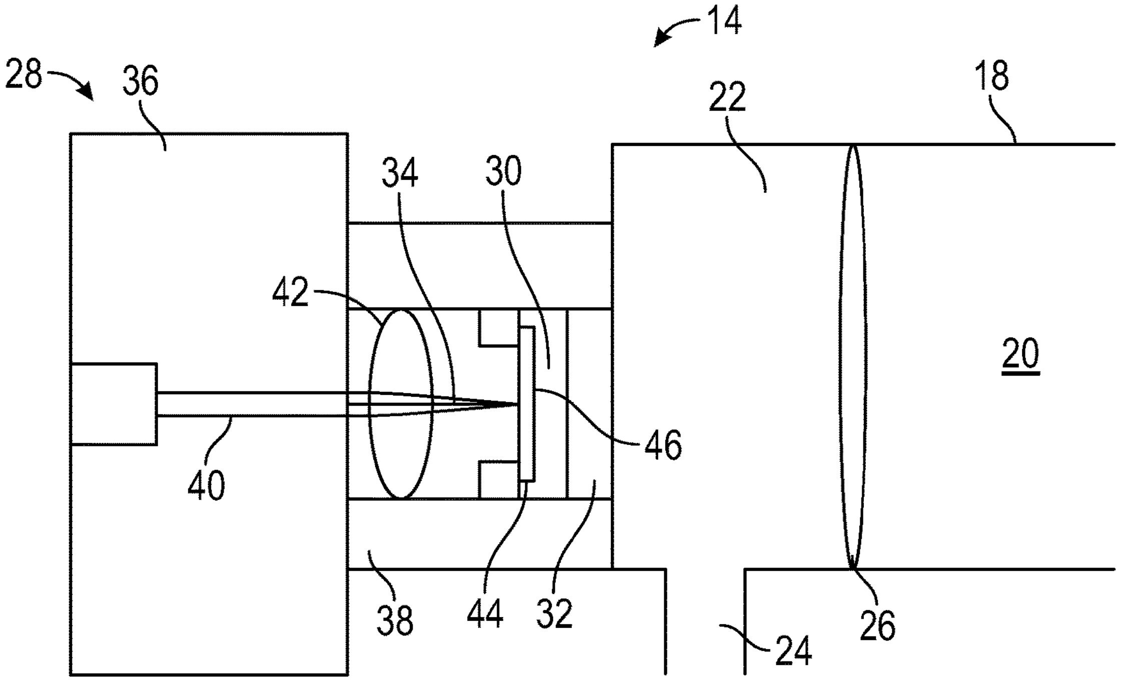
FIG. 3 is a schematic illustration of an embodiment of a firing cartridge of a fire extinguisher.

Referring now to FIG. 3, the firing cartridge 28 including an ignition charge 30 and an output charge 32. When the ignition charge 30 is activated, the ignition charge 30 ignites the output charge 32, which when activated ruptures the burst disk 26.

In the present disclosure, a light signal 34 is utilized to activate the ignition charge 30 The firing cartridge 28 includes a connector housing 36 connected to a cartridge housing 38, and includes an optical fiber 40 along which the light signal 34 is transmitted. The light signal 34 is transmitted through a lens 42 located between the optical fiber 40 and a bridge wire 44 extending across the ignition charge 30. The lens 42 is configured and positioned such that a lens focal point 46 is located at the bridge wire 44, such that the light signal 34 converges at the bridge wire 44 to heat the bridge wire 44 to the ignition temperature of the ignition charge 30. The ignition charge 30 is thus detonated initiating output charge 32 to puncture the burst disk 26 and release the fire suppressant material 20. While in the embodiment of FIG. 3 a bridge wire 44 is utilized to ignite the ignition charge 30, in other embodiments the light signal 34 may be converged on other elements to heat the ignition charge 30, or the bridge wire 44 may be omitted and the light signal 34 may be converged directly onto the ignition charge 30 to heat and detonate the ignition charge 30.

Referring again to FIG. 1, the light signal 34 is emitted from a light source 48, which in some embodiments is a laser, which is operably connected to the controller 16, which controls operation of the light source 48. Each firing cartridge 28 connected to each fire extinguisher 14 is connected to the light source 48 via the optical fiber 40, which may include one or more branches extending from the light source 48 to each firing cartridge 28. In some embodiments, one or more sensors 50 are located in the aircraft 10 to detect a fire or smoke condition and are operably connected to the light source 48 via the controller 16. When a sensor 50 detects a fire or smoke condition, the light source 48 is activated to initiate activation of one or more fire extinguishers 14 via the respective firing cartridge 28. In some embodiments, all of the fire extinguishers 14 may be activated, or fire extinguishers 14 may be selectively activated based on a location of the sensor 50 detecting a fire or smoke condition.

Fiber optic activation of the fire extinguishers 14 is immune to electrostatic discharge and lightning disruption, and also immune to electromagnetic interference and are unaffected by moisture or gas ingress. Further, optical fibers 40 have a low loss relative to the fiber length, and small size and weight. Further, optical fibers 40 may be utilized safely in environments characterized by hazardous materials and have high sensitivity and have a high degree of long term reliability.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fire protection system, comprising:

a fire extinguisher including:

a housing containing a volume of fire suppressant material;

an extinguisher outlet; and a burst disk, the burst disk configured to retain the volume of fire suppressant material in the housing; and a firing cartridge operably connected to the fire extinguisher, the firing cartridge including:

an output charge;

an ignition charge that, when detonated, causes release of the output charge to rupture the burst disk and release the volume of fire suppressant material through the extinguisher outlet;

an optical fiber configured to transmit a light signal toward the ignition charge to heat and detonate the ignition charge; and a light source operably connected to the optical fiber to transmit the light signal along the optical fiber.

2. The fire protection system of claim 1, further comprising a bridge wire disposed between the optical fiber and the ignition charge, the light signal configured to heat the bridge wire to detonate the ignition charge.

3. The fire protection system of claim 2, further comprising a lens disposed between the optical fiber and the bridge wire, the lens configured to converge the light signal at the bridge wire to heat the bridge wire.

4. The fire protection system of claim 1, wherein the light source is a laser.

5. The fire protection system of claim 1, wherein two or more fire extinguishers are operably connected to the light source.

6. The fire protection system of claim 1, further comprising a sensor operably connected to the light source, the sensor configured to detect a fire or smoke condition to initiate operation of the light source.

7. A method of operating a fire protection system, comprising:

providing a fire extinguisher at a selected location, the fire extinguisher including:

a housing containing a volume of fire suppressant material;

an extinguisher outlet; and a burst disk, the burst disk configured to retain the volume of fire suppressant material in the housing; and operably connecting a firing cartridge to the fire extinguisher, the firing cartridge including:

an output charge;

an ignition charge that, when detonated, causes release of the output charge to rupture the burst disk and release the volume of fire suppressant material through the extinguisher outlet;

transmitting a light signal from a light source along an optical fiber toward the ignition charge; and heating the ignition charge via the light signal, thereby detonating the ignition charge.

8. The method of claim 7, further comprising heating a bridge wire disposed between the optical fiber and the ignition charge via the light signal, wherein heating of the bridge wire detonates the ignition charge.

9. The method of claim 8, further comprising transmitting the light signal through a lens disposed between the optical fiber and the bridge wire, the lens configured to converge the light signal at the bridge wire to heat the bridge wire.

10. The method of claim 7, wherein the light source is a laser.

11. The method of claim 7, wherein two or more fire extinguishers are operably connected to the light source.

12. The method of claim 7, further comprising:

detecting a smoke or fire condition via a sensor operably connected to the light source; and initiating operation of the light source when the smoke or fire condition is detected.

13. An aircraft comprising:

an aircraft structure; and a fire protection system disposed in the aircraft structure, the fire protection system including:

a fire extinguisher including:

a housing containing a volume of fire suppressant material;

an extinguisher outlet; and a burst disk, the burst disk configured to retain the volume of fire suppressant material in the housing; and a firing cartridge operably connected to the fire extinguisher, the firing cartridge including:

an output charge;

an ignition charge that, when detonated, causes release of the output charge to rupture the burst disk and release the volume of fire suppressant material through the extinguisher outlet;

an optical fiber configured to transmit a light signal toward the ignition charge to heat and detonate the ignition charge; and a light source operably connected to the optical fiber to transmit the light signal along the optical fiber.

14. The aircraft of claim 13, further comprising a bridge wire disposed between the optical fiber and the ignition charge, the light signal configured to heat the bridge wire to detonate the ignition charge.

15. The aircraft of claim 14, further comprising a lens disposed between the optical fiber and the bridge wire, the lens configured to converge the light signal at the bridge wire to heat the bridge wire.

16. The aircraft of claim 13, wherein the light source is a laser.

17. The aircraft of claim 13, further comprising a sensor operably connected to the light source, the sensor configured to detect a fire or smoke condition to initiate operation of the light source.

18. The aircraft of claim 13, wherein two or more fire extinguishers are operably connected to the light source.

* * * * *